US005790935A

United States Patent [19]

Payton

[11] Patent Number: 5,790,935
[45] Date of Patent: Aug. 4, 1998

[54] VIRTUAL ON-DEMAND DIGITAL INFORMATION DELIVERY SYSTEM AND METHOD

[75] Inventor: David W. Payton, Woodland Hills, Calif.

[73] Assignee: Hughes Aircraft Company, Los Angeles, Calif.

[21] Appl. No.: 594,064

[22] Filed: Jan. 30, 1996

[51] Int. Cl.⁶ .................................................. H07N 7/173
[52] U.S. Cl. ............................... 455/5.1; 348/7; 348/12; 395/200.49
[58] Field of Search .................... 348/6, 7, 8, 9, 348/10, 12, 13; 455/3.1, 4.1, 5.1, 6.1, 6.2; 395/200.3, 200.38, 200.47, 200.48, 200.49; H04N 7/173

[56] References Cited

U.S. PATENT DOCUMENTS

| | | |
|---|---|---|
| 5,410,343 | 4/1995 | Coddington et al. . |
| 5,410,344 | 4/1995 | Graves et al. . |
| 5,434,678 | 7/1995 | Abecassis . |
| 5,442,390 | 8/1995 | Hooper et al. . |

OTHER PUBLICATIONS

D. Goldberg, D. Nichols, B.M. Oki and D. Terry, "Collaborative Filtering To Weave An Information Tapestry", Comm. of the ACM, vol. 35, No. 12, pp. 61–70, Dec., 1992.

S. Loeb, "Architecting Personalized Delivery of Multimedia Information", Comm. of the ACM, vol. 35, No. 12, pp. 39–48, Dec., 1992.

B. Sheth, P. Maes, "Evolving Agents for Personalized Information Filtering", Proced. of the Ninth IEEE Conf. on Artif. Intell. for Apps., 1993.

U. Shardanand, P. Maes, "Social Information Filtering: Algorithms for Automating 'Word of Mouth'", CHI-95 Conf. Proceedings, Denver, May, 1995.

*Primary Examiner*—John K. Peng
*Assistant Examiner*—Nathan J. Flynn
*Attorney, Agent, or Firm*—Georgann S. Grunebach; Michael W. Sales; Wanda K. Denson-Low

[57] ABSTRACT

A digital information system delivers virtual on-demand information over existing, as well as the next generation, digital transport systems by offloading a portion of the systems' peak bandwidth requirements to the local subscribers. A collaborative filtering system synthesizes the preferences of all of the subscribers and then predicts those items that each subscriber might like, and therefore request. Each subscriber is provided with a local storage device for storing, during off-peak hours, those items recommended by the collaborative filtering system. As a result, only a relatively few subscriber requests must be serviced directly from the central distribution system.

35 Claims, 8 Drawing Sheets

VIRTUAL ON-DEMAND DIGITAL INFORMATION DELIVERY SYSTEM AND METHOD

BACKGROUND OF THE INVENTION

1. Field of the Invention

This invention relates to the broadcasting of digital information to local subscribers and more specifically to a delivery system that offloads a substantial portion of the system's bandwidth requirement by intelligently caching data at the site of the local subscribers to provide a virtual on-demand delivery system.

2. Description of the Related Art

Existing broadcast systems do not provide true on-demand access but rather provide near on-demand service in which digital video, audio or other information is broadcast to the subscribers at staggered intervals. Near on-demand services limit the number of available selections, confine the subscribers to certain viewing times, and do not provide viewing flexibility. Near on-demand services are designed to use a relatively small amount of bandwidth so that they can be implemented, and implemented for a profit, on existing transport systems such as cable systems, commercial satellites, and other similar broadcast media.

Hughes Aircraft Company provides digital direct broadcast systems such as DIRECTV® and DIRECPC™ that broadcast via satellite TV programs and computer applications, respectively. DIRECTV® broadcasts television programming at regular intervals in much the same fashion as conventional TV. In DIRECPC™, computer subscribers post their requests such that during the next scheduled broadcast, the requested applications, if contained in that broadcast, are downloaded to the subscriber's computer. This system can also service on-demand requests, but only to a limited number of subscribers at any given time.

A true on-demand service would provide a wide range of selections, on-demand access to those selections, and a capability of controlling the broadcast with features such as pause, fast forward and reverse. Because a majority of subscribers use their home entertainment and information systems in the evening, a true on-demand service would require an immense amount of peak bandwidth capability. The existing twisted-pair network cannot provide this bandwidth, and although satellites can physically provide on-demand service it is not cost-effective to allocate a unique portion of bandwidth to each subscriber request.

In anticipation of the next-generation cable and fiber networks that will replace the twisted-pair network and provide a much larger bandwidth, service providers are developing true on-demand systems, in which each subscriber can interact directly with the central video distribution server to preview the available selections, request one of the selections, and control its broadcast. However, the implementation of a complete fiber optic network that provides service to all of the households in the U.S. and worldwide is still far in the future. Secondly, as the number of subscribers and types of services increases, bandwidth considerations will once again become an important issue. Lastly, these next generation systems will remain commercially nonviable with satellite systems.

Video servers can also be used to deliver on-demand video to a large group of subscribers in a local area such as guests in a hotel. The video server includes a single mass storage and a computer for controlling service. When a customer requests a movie, he or she is assigned a channel on an internal cable system and the selected movie is broadcast on that channel. Once a channel is assigned, no other viewer can have access to that channel. Thus, the viewer can pause, rewind, and continue the movie at will. However, the size of the mass storage is limited so that video servers typically only store the most recent and popular selections. Furthermore, because the video server requires a dedicated cable network to deliver on-demand video it is limited to applications such as hotels where the total number of channels that must be allocated at any given time is not likely to exceed the capacity of the network.

Information filtering systems have been developed to assist people in selecting electronic mail messages, music selections, literature and television programs. These systems help the subscriber sort through a vast array of possible selections to find just a few that might be of interest. One type of information filtering system extracts patterns from the observed behavior of the subscriber. Patterns of how the subscriber interacts with certain items are used to rank other items in terms of their likelihood of being selected or rejected by the subscriber. U.S. Pat. No. 5,410,344 entitled "Apparatus and method of selecting video preferences" describes a system for selecting television programs for presentation to a viewer. Each program includes a content header that contains a classification for common attributes such as action, comedy, musical, romance, violence, nudity, language, producer, director, broadcasting network and special effects. Each subscriber has a preference file that includes his or her preferences in each of these categories. A neural network whose weights are trained in accordance with the subscriber's profile operates on the content header to produce a rating for each program. Those programs that are similar to the subscriber's profile are assigned a high rating. At least one of the higher rated programs is selected for presentation to the viewer. After viewing, the subscriber rates the program. The difference between the viewer's actual rating and the predicted rating is then used to retrain the neural network's weights to more accurately reflect the subscriber's preferences.

Another type of known information filtering system synthesizes the behavior of a large group of subscribers. Instead of attempting to analyze documents based on keywords or content, a collaborative filtering technique as described by Goldberg, "Using Collaborative Filtering to Weave an Information Tapestry," *Communications of the ACM*, December 1992, VOl 35, No 12, pp. 61–70, transforms each subscriber into the role of a critic. For any given subscriber, the likes and dislikes of the subscribers with similar interests are used to predict items that would appeal to that subscriber. Collaborative techniques require a large group of diverse subscribers, both past and present, each having accessed and rated a broad range of different items. As a result, these techniques can accurately predict items that would interest any particular subscriber over a very broad range and can rapidly adapt to changes in a subscriber's needs or preferences.

SUMMARY OF THE INVENTION

In view of the above problems, the present invention provides a virtual on-demand digital information delivery system for use with existing digital transport systems.

This is accomplished with a central distribution server that broadcasts digital information over a high bandwidth digital transport system to a large number of subscribers. Each subscriber has a local server that downloads recommended and specifically requested items and stores them in a local storage device. Side information including subscriber profiles, the subscriber requests, and lists of recommended items are communicated between the central distribution server and the subscribers over a low bandwidth back channel or through the broadcast medium. A collaborative filtering system synthesizes the subscriber profiles and generates the list of recommended items for each subscriber.

During off-peak hours, the collaborative filter updates the subscriber profiles, synthesizes them, predicts which items each subscriber is likely to request, and identifies the additions from the previous day's broadcast. The central distribution server merges common requests, places them in a queue based on relative demand, and then broadcasts them to all of the subscribers. The local server for each subscriber replaces those items which are no longer on his or her recommended list with the newly broadcast items.

During both on and off-peak hours, the system services on-demand requests from the various subscribers. Each subscriber views his or her recommended list and then makes a request, either from the list or from other items available directly from the central distribution server. The central server may vary the number of additional items that are available to the subscribers depending on the load on the digital transport system. In response to a subscriber request, the local server first polls the local storage to see if the requested item is stored locally. If the item is not immediately available, the local server sends the request over the back channel to the central distribution server, which places the request in the queue for on-demand broadcast. As soon as the item is received locally, it is sent to a local playback device.

By predicting which items each subscriber is likely to request, storing them locally, and then recommending those items to the subscriber, the system reduces the number of subscriber requests that must be provided on-demand from the central distribution server. This offloading of required bandwidth from the central distribution server to the local servers allows the existing transport systems, as well as the next generation systems, to support virtual on-demand service.

These and other features and advantages of the invention will be apparent to those skilled in the art from the following detailed description of preferred embodiments, taken together with the accompanying drawings, in which:

DETAILED DESCRIPTION OF THE INVENTION

The present invention provides virtual on-demand delivery of digital information over existing, as well as next generation, digital transport systems by offloading a portion of the systems' peak bandwidth requirements to the local subscribers. A collaborative filtering system synthesizes the preferences of all of the subscribers and then for each subscriber predicts those items that he or she might like, and therefore request. Each subscriber is provided with a local storage device for storing, during off-peak hours, those items recommended by the collaborative filtering system. As a result, only a relatively few subscriber requests must be serviced directly from the central distribution system. Thus, the existing transport systems are capable of handling the reduced number of requests so that the delivery system can provide virtual on-demand service.

Figure 1A:
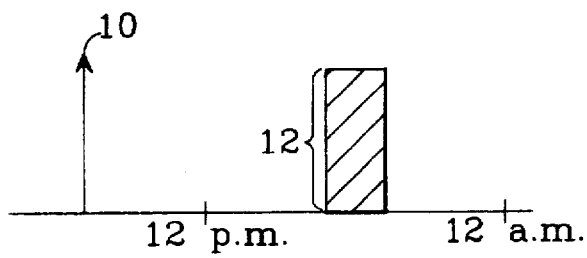
FIGS. 1a and 1b are plots that illustrate true on-demand and virtual on-demand bandwidth requirements for a delivery system in accordance with the present invention.
Figure 1B:
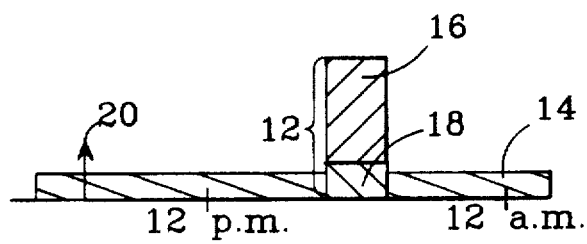

As shown in FIG. 1a peak demand for home entertainment or information systems occurs in a concentrated period of time, typically in the early evening from approximately 6 to 10 p.m. A true on-demand system would require a large enough bandwidth to service all requests during peak hours so that peak capacity 10 must be at least the on-demand transport access 12. As a result existing satellites and cable networks are not capable of providing on-demand service. In contrast, the transport capacity for the virtual on-demand system of the present invention need only be sufficient to meet the subscribers' on-demand requests that cannot be serviced from their respective local storage systems. As shown in FIG. 1b, broadcasting the recommended items to the subscribers during off-peak hours (download access 14) and storing the items locally (local access 16) reduces the on-demand access 18 of transport system by 95% or more depending on the effectiveness of the collaborative filtering system. As a result, the peak transport capacity 20 required to provide virtual on-demand service can be less than 5% of the bandwidth that would be required to provide a true on-demand system. Commercially available satellites or cable systems can provide this bandwidth cost effectively.

Figure 2:
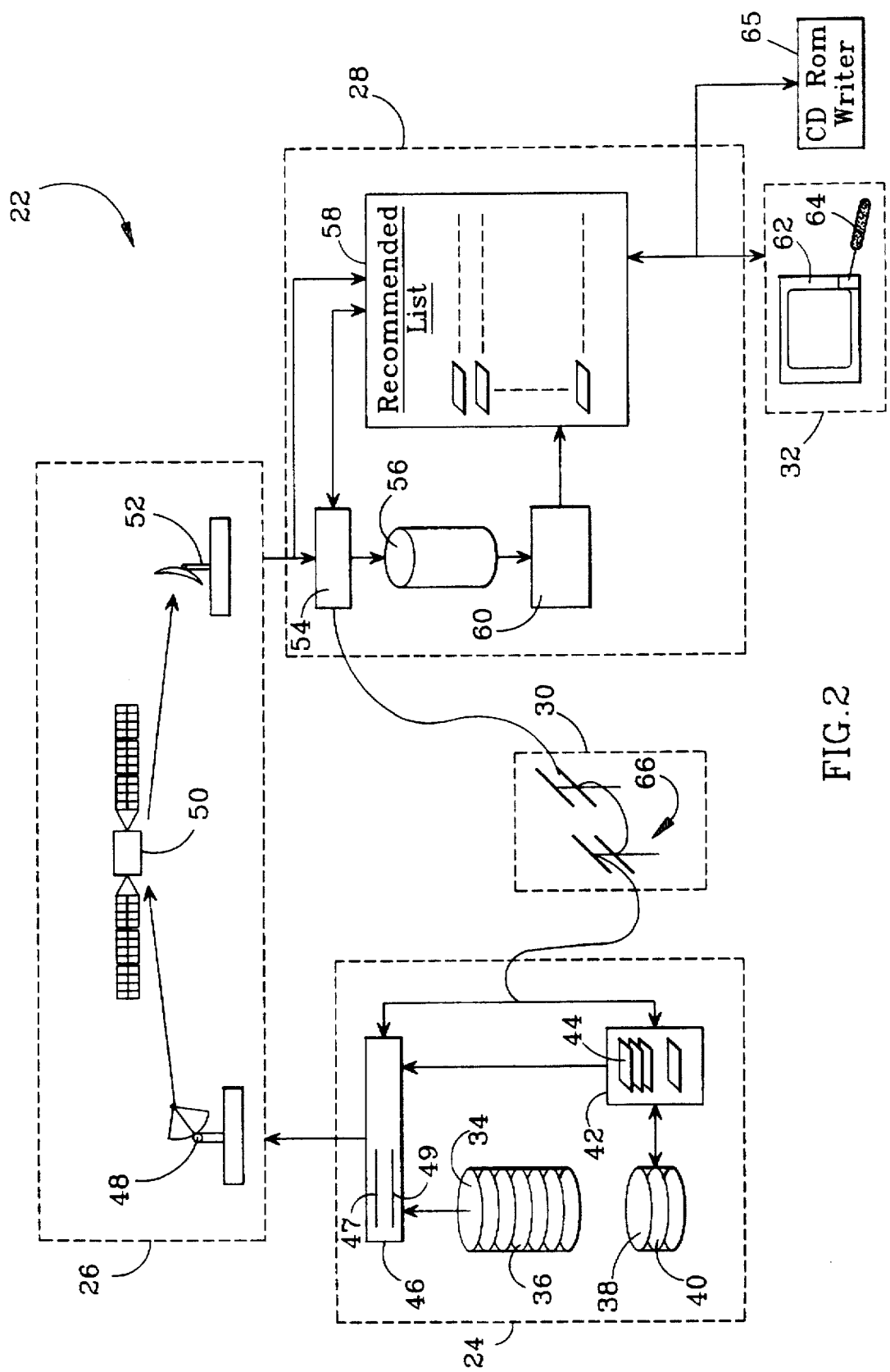
FIG. 2 is a diagram of a preferred virtual on-demand system architecture in accordance with the present invention.

As shown in FIG. 2, a virtual on-demand digital delivery system 22 includes a central distribution server 24, a high bandwidth digital transport system 26, a local server 28 for each subscriber in the group, and a low bandwidth back channel 30. The high bandwidth transport system 26 and the low bandwidth back channel 30 can be replaced by a single bidirectional channel as shown in detail in FIG. 9. In response to a subscriber's request, the delivery system 22 delivers the requested item to the subscriber's playback device 32 such as a television, audio system or computer.

The central distribution server 24 includes a digital repository 34 for storing all of the digital items 36 that will be made available to the subscribers. The digital items may include videos, audio selections and computer applications. The digital items are preferably stored in a compressed format to improve storage and transport efficiency. The Motion Picture Entertainment Group (MPEG2) compression algorithm provides approximately two orders of magnitude of video compression while maintaining sufficient signal quality. Furthermore, the digital items are preferably encrypted so that downloaded items cannot be accessed without first being paid for. For example, a 1000G hard disk or a rapid access tape drive might be used to store approximately 600 movies. For software, games, and music, much smaller amounts of storage will suffice. Alternately, the repository could comprise a high bandwidth network that retrieves the items from a centralized location or from a distributed network of repositories.

A subscriber data base 38 stores a subscriber profile 40 for each of the subscribers. The subscriber profile 40 preferably includes a rating vector (shown in FIG. 6) in which the subscriber has rated each of the items he or she has previously requested. The subscriber profile 40 may also include demographic information about the subscriber such as the subscriber's general likes and dislikes. A collaborative filtering system 42 synthesizes the subscriber profiles 40, predicts which of the available items 36 each subscriber may be interested in or may request, and produces a list 44 of those recommended items for each subscriber. The list may comprise only items that a particular subscriber has never previously requested or may contain a mix of the highest recommended items and a few previously viewed items that the subscriber rated very highly, and is thus likely to request again.

A scheduling processor 46 merges the lists 44 of recommended items to prioritize the items 36 from the most to the least frequently recommended and places identifiers for these items in a refresh queue 47 for broadcast over the digital transport system 26. When the recommended items reach the top of the refresh queue 47, they are retrieved from repository 34 and are broadcast to the local users, preferably during off-peak viewing hours so that all of the system's bandwidth is available to service on-demand requests during on-peak hours. In response to a subscriber's on-demand request that cannot be served by that subscriber's local server 28, the scheduling processor 46 merges requests for that item and places it in an on-demand 49 queue. Items broadcast in response to subscriber requests take priority over the broadcast of the recommended items. As a result, the subscribers' on-demand requests are served either from their local server or from the central distribution server 24 virtually on-demand. The subscribers encounter only small delays so that the system appears transparent. If the system becomes loaded, the scheduling processor 46 limits the number of items, in addition to those stored on the subscribers' local servers, that are available to the subscribers. This has the effect of reducing the number of on-demand requests made to the central distribution server.

Alternatively, on-demand requests can be treated the same as recommended items and broadcast during the next refresh broadcast. As a result, those items not included on the current list are not available on demand. Furthermore, the local subscriber's requests can be limited to those on their recommended lists. This would greatly simplify the scheduling of items to allocate bandwidth effectively but would require better prediction algorithms to meet the individual needs of the subscribers.

The digital transport system 26 broadcasts the digital items 36 from the central distribution server 24 to each of the local servers 28. The transport system 26 is only required to have a capacity equal to the on-demand access 18 shown in FIG. 1b. Thus, existing transport systems including commercial satellites, cable and wire networks as well as the next generation fiber optic and cable networks can support the delivery system 22. The transport system 26 as shown is a satellite network that includes a central transmitter 48, a broadcast satellite 50, and a plurality of local receivers 52. The central transmitter 48 transmits the scheduled digital items 36 to the broadcast satellite 50, which in turn transmits all of the items to the local receivers 52.

Each local server 28 includes a predictive filter 54 that downloads those items 36 that are on the subscriber's list 44 of recommended items and not already stored on a local storage 56 and those items specifically requested by the subscriber. The filter 54 deletes from storage 56 previously requested items and those items which are no longer on the recommended list. A subscriber interface 58 communicates with the predictive filter 54 to receive and display the list 44 of recommended items. The predictive filter sends the subscriber's requests and subscriber profile information back to the central distribution server 24. As a requested item 36 is being received, it is downloaded to the local storage 56, while a decryption and decompression processor 60 decrypts, decompresses and converts the item from the digital format into a standard video or audio signal, and sends the signal to the interface control which routes the signal to the subscriber's playback device 32. Techniques for converting digitally formatted and encrypted signals into the standard video and audio signals are well known in the art.

The subscriber's playback device 32 preferably includes some type of a video display 62 such as a T.V. or a computer monitor and a control device 64 such as a remote or a keyboard. The device may also include a CD ROM writer 65, which writes a digital audio signal onto a blank CD ROM, which can then be played on a separate audio system. To request an item, the subscriber interface 58 displays the list 44 of recommended items, their respective average ratings for the subscriber's group, and any comments on the video display. The subscriber can either select one of the displayed items using the control device or request a menu of the remaining available items. Alternately, the initial menu might show all offerings with the recommended items highlighted. By recommending the locally stored items to the subscriber and making them easy to select, the delivery system 22 reduces the probability that an on-demand request will be made from the central distribution server 24. After using the requested item, the subscriber interface 58 preferably prompts the subscriber to enter a rating. This can be as simple as pushing a number on a scale from 1 to 10 or may additionally include entering comments about the item. Alternately, the system could just record the use of the item as a positive vote. This is somewhat simpler but does not provide nearly as much useful information on which to base future predictions. As an additional feature, the local server 28 can serve as a smart VCR by monitoring a subscriber's viewing habits for non-paying programs and by storing regularly watched programs if the viewer happens to be missing them. This information about regular viewing habits can be used to augment the subscriber profile to improve prediction.

The back channel 30 is used only to transmit the subscribers' requests and updated profiles 40 from the subscribers back to the central distribution server 24 and to transmit some of the lists 44 of recommended items from the server 24 to the respective local servers 28. This type of information requires a bidirectional capability but very little bandwidth, and hence a low bandwidth channel such as the existing twisted-pair wire network 66 is more than adequate.

Figure 3A:
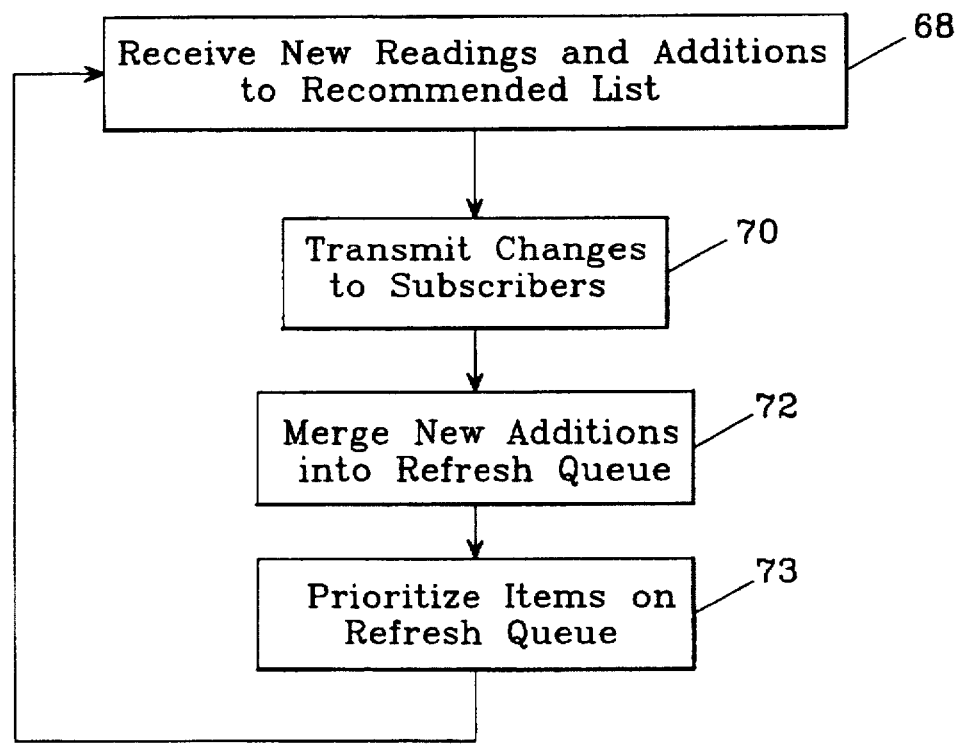
FIGS. 3a, 3b and 3c are flowcharts illustrating operation of the virtual on-demand system of FIG. 2.
Figure 3B:
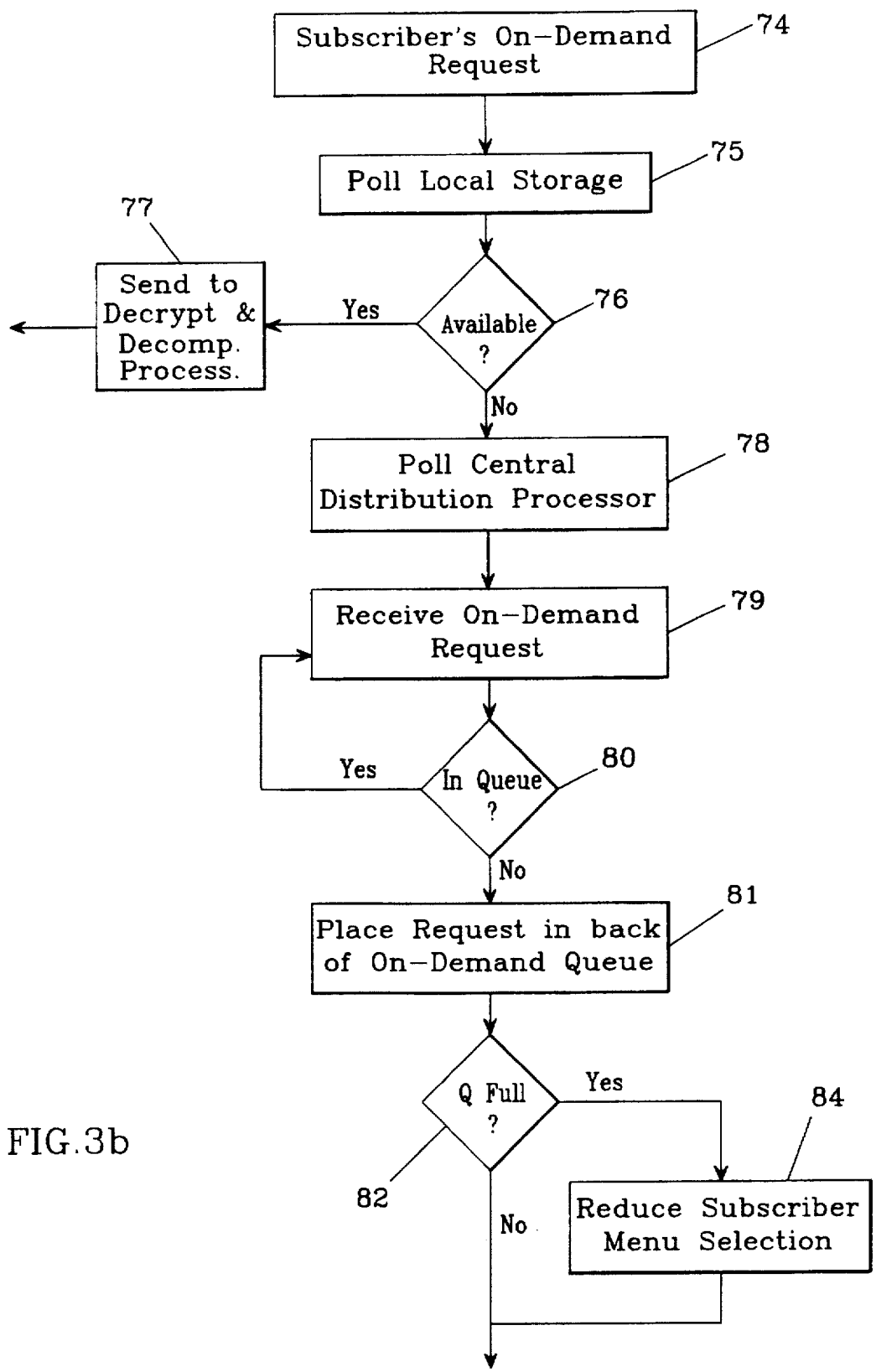
Figure 3C:
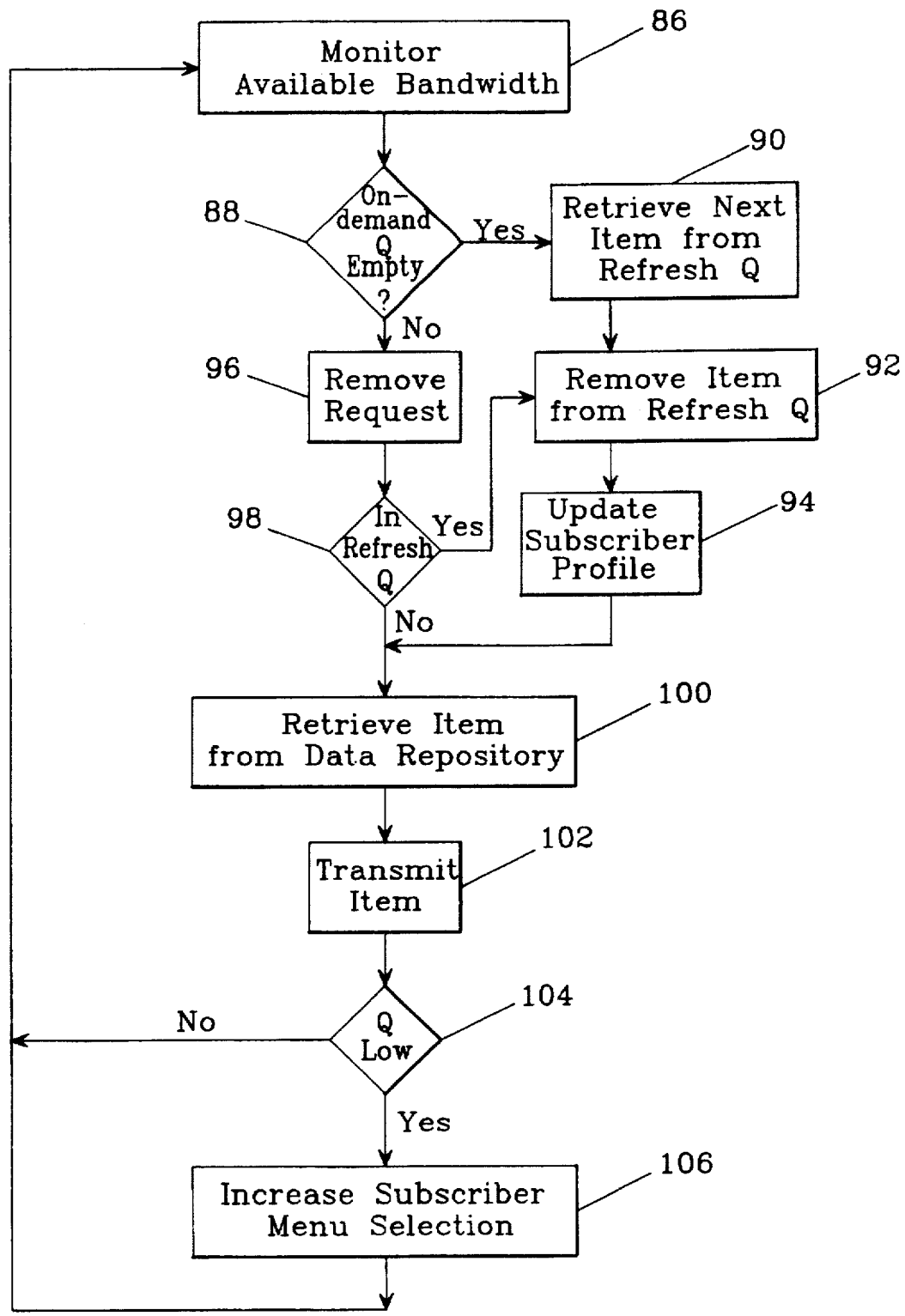

FIGS. 3a, 3b and 3c are flowcharts illustrating the off-peak scheduling, on-demand scheduling, and continuous operation, respectively, of the delivery- system 22, and particularly the scheduling processor 46 shown in FIG. 2 to transmit items to the subscribers. As shown in FIG. 3a, to refresh the subscribers' local stored digital items, the scheduling processor 46 periodically receives the updated list 44 of recommended items for each subscriber from the collaborative filter 42 (step 68). In step 70, the scheduling processor 46 transmits the changes in the lists to the subscribers, preferably over the high bandwidth digital transport system 26. The scheduling processor 46 merges the new additions to the list into a refresh queue (step 72) and prioritizes the items (step 73) so that the items recommended for the largest number of subscribers are placed at the front of the queue. Transmission of items in the refresh queue is described in FIG. 3c. Off-peak prediction and refresh is suitably performed once a day. This is a short enough period to adequately serve the subscribers and a long enough period to download all of the recommended items without loading the transport system.

As shown in FIG. 3b, when a subscriber makes an on-demand request (step 74), the local server 28 polls the local storage 56 (step 75) to determine whether the requested item is stored locally (step 76). If it is stored locally, the item is sent to the decryption and decompression processor (step 77) 60 and then routed to the subscriber. Otherwise, the local server polls the central distribution processor by sending the request over the back channel (step 78). The scheduling processor 46 receives the new on-demand requests from the subscribers (step 79). In step 80, the processor determines whether the newly requested item is already in an on-demand queue 49. If not, the processor places the request at the back of the on-demand queue 49 (step 81). In step 82, the processor determines whether the on-demand queue is too full. If it is, the processor broadcasts a message to the subscribers over the digital transport system 26 to reduce the number of menu selections available to the subscribers (step 84). By dynamically varying the number of items that are made available to the subscribers, over-and-above the recommended items, the load on the transport system does not exceed its peak bandwidth. This ensures that an on-demand request can be served with minimal delay, and thus provide a virtual on-demand delivery system.

As shown in FIG. 3c, to transmit the subscribers' on-demand requests and the periodically refreshed items, the scheduling processor 46 monitors available bandwidth over the digital transport system 26 (step 86) and determines whether sufficient bandwidth is available for transmission of another item. If bandwidth is available and the on-demand queue 49 is empty (step 88), the processor 46 retrieves the next item from the refresh queue 47 (step 90), removes the item from the queue 47 (step 92), and updates the subscriber profiles to reflect the storage change that will occur when the item is received by the subscribers' local servers 28 (step 94). If the on-demand queue 49 is not empty, the processor 46 removes the on-demand request from the front of the on-demand queue 49 (step 96) and determines whether the on-demand request is also in the refresh queue 47 (step 98). If it is, the request is removed from the refresh queue (step 92). The processor then retrieves the on-demand requested or scheduled refresh item 36 from the digital repository 34 (step 100). Thereafter, the processor transmits the item 36 over the digital transport 26 to the local subscribers (step 102). The processor determines whether the load on the on-demand queue is low (step 104). If the demand is low, the processor broadcasts over the digital transport system 26 a request to increase the menu selection available to the subscribers (step 106).

Figure 4:
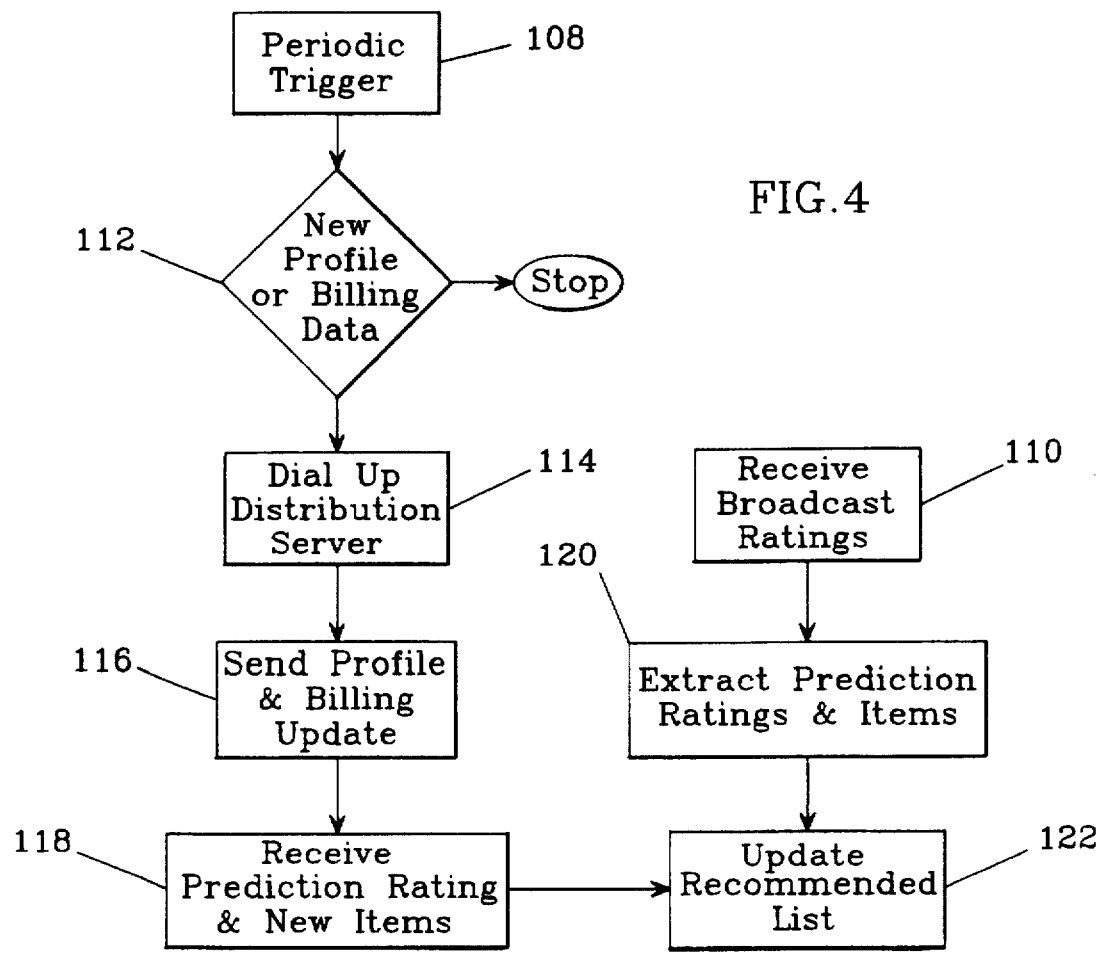
FIG. 4 is a flowchart of the predictive filter for updating the subscribers' priority lists.

As shown in FIG. 4, each local server's predictive filter 54 updates its list 44 of recommended items in response to both a local periodic refresh via the backchannel 30 (step 108) and a broadcast over the digital transport system 26 (step 110). In response to the periodic trigger, the local server 28 determines whether new subscriber profile data or billing data exists (step 112). If new data does exist, the local server dials up the distribution server 24 to establish a communication channel (step 114). The prediction filter sends the new profile and billing data back to the distribution server 24 (step 116) and receives the prediction ratings and newly recommended items from the server 24 (step 118). In response to a direct broadcast, the prediction filter 54 extracts the prediction ratings changes and newly recommended items from the server 24 (step 120). Thereafter, the prediction filter updates the list 44 of recommended items (step 122).

Figure 5:
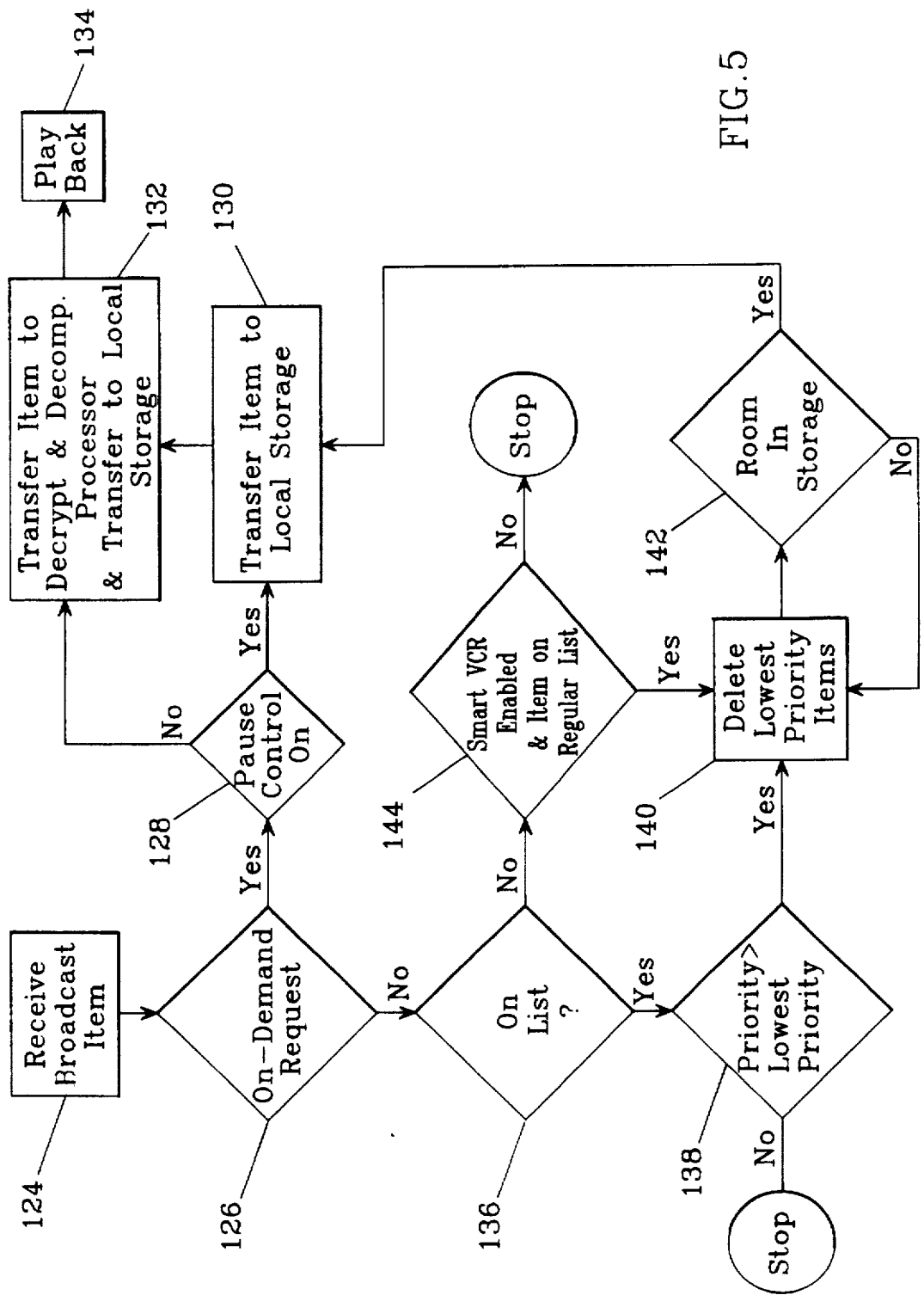
FIG. 5 is a flowchart of the predictive filter for downloading the digital items.

As shown in FIG. 5, to download broadcast items the prediction filter 54 receives the broadcast item (step 124) from the local receiver 52 or from broadcast television. The filter then determines whether the item is an on-demand request from the subscriber (step 126). If it is, the filter determines whether the pause control is on (step 128), and if so routes the item to the local storage 56 (step 130). Once the pause control is released, the item is transferred to the decryption and decompression processor 60 (step 132) and then routed to the playback device 32 or CD ROM writer 65 (step 134). The item is simultaneously transferred to local storage to allow the user to rewind at any time. Also, if the pause control is released during transfer to storage, the item is transferred to decryption from storage while storage continues to be loaded from the received broadcast.

If the received item is not an on-demand request, the filter determines whether the item is on the list 44 of recommended items (step 136). If yes, the filter determines whether the item's priority is greater than the lowest priority item currently stored (step 138). If it is, the filter deletes the lowest priority item from storage (step 140) and determines whether there is enough storage for the new item (step 142). If not, the filter returns to step 140 and deletes the next lowest priority item. Otherwise, the filter routes the item to storage (step 130) where it is stored until requested by the subscriber.

The prediction filter also monitors the broadcast television programs viewed by the subscriber and learns the subscriber's regular viewing habits to implement a "smart" VCR. Well known neural network algorithms can be used to learn the subscriber's viewing habits and to predict which programs are regularly viewed. If the received item is a broadcast television signal it will not be on the subscriber's recommended list (step 136). In step 144, the filter determines whether the smart VCR is enabled and whether the item is on the subscriber's regular viewing list. If so, the filter deletes the lowest priority item (step 140) and routes it to the local storage (step 130).

Figure 6:
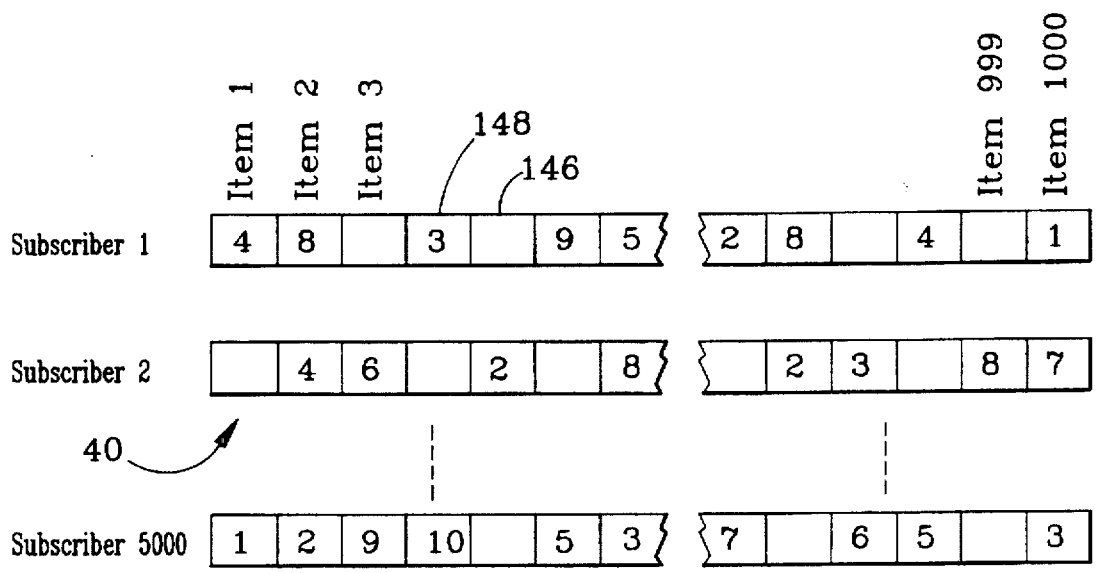
FIG. 6 illustrates a preferred subscriber profile.

As shown in FIG. 6, the subscriber profile 40 preferably includes rating vectors 146. The vectors 146 have a length equal to the total number of items stored in the central distribution server and each dimension of the vector corresponds to a particular item 36 and is assigned a rating 148. The empty spaces in the vector 146 represent items which have not been rated. The collaborative filter predicts ratings for these based on the ratings of the other subscribers in the group.

Figures 7A, 7B:
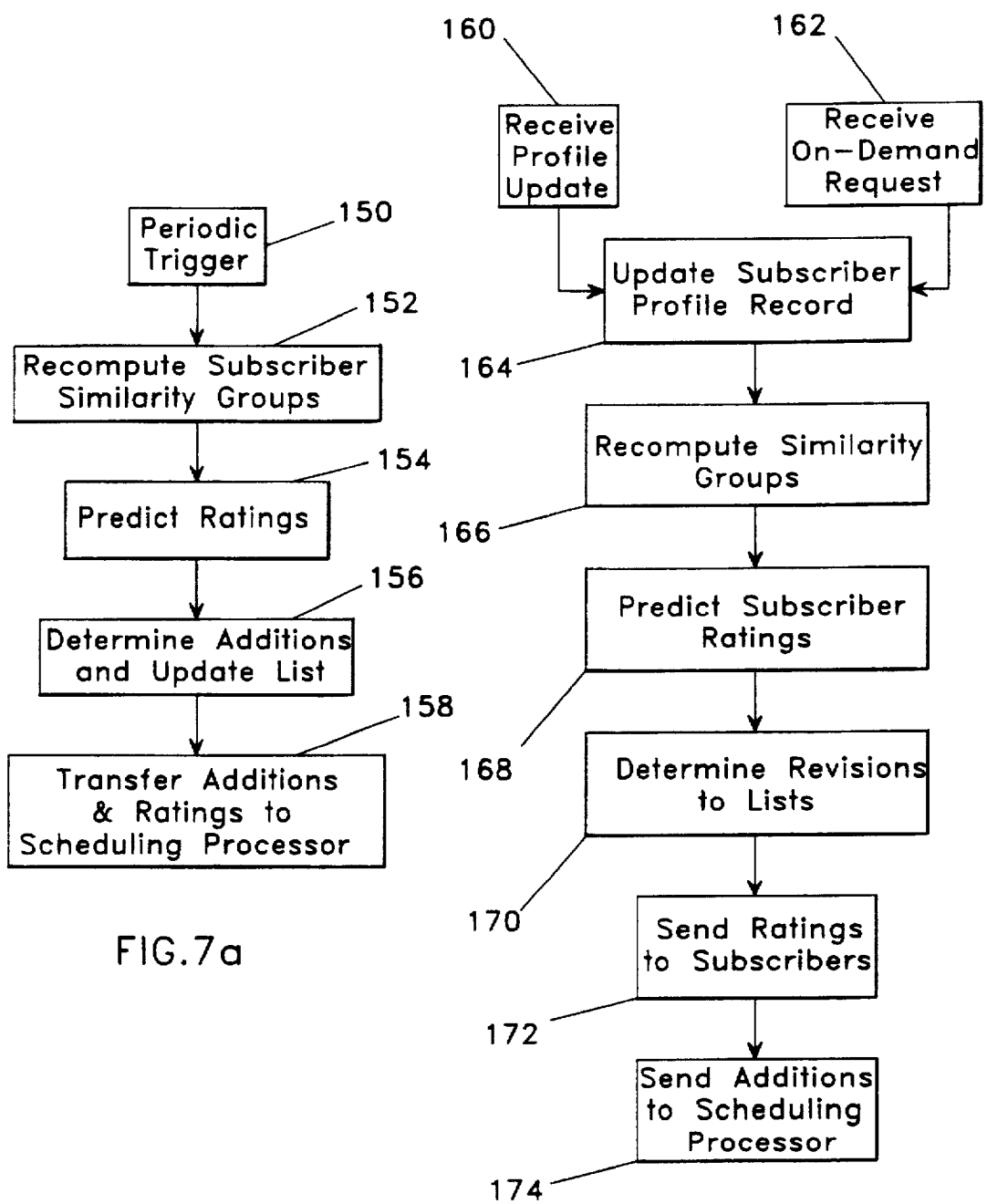
FIGS. 7a and 7b are flowcharts illustrating a preferred embodiment for the collaborative filter system shown in FIG. 2.

FIGS. 7a and 7b illustrate the basic steps executed by the collaborative filter 42 periodically and asynchronously, respectively. In FIG. 7a, the collaborative filter 42 responds to a periodic trigger (step 150) by recomputing all subscriber similarity groups (step 152). Based on these groupings, the filter 42 predicts ratings for each subscriber for the available digital items (step 154). Thereafter, the filter determines which of those items, based on their ratings, are likely to interest the subscriber and generates a new list 44 of recommended items (step 156). The collaborative filter 42 transfers the additions to the list and their respective ratings to the scheduling processor 46 (158).

In FIG. 7b, the collaborative filter 42 responds to both the reception of a subscriber profile update from any of the local servers (step 160) and the reception of a new on-demand request (step 162). The collaborative filter 42 then updates the subscriber profile 40 (step 164), recomputes the subscriber similarity groups (step 166), predicts subscriber ratings (168), and determines revisions to the subscribers' lists of recommended items (step 170). The filter 42 sends the ratings changes to the subscriber (step 172) and sends the additions to the scheduling processor (step 174).

A number of specific algorithms can be used to compute the similarity measures and construct the similarity groups. A mean squared differences algorithm measures the degree of dissimilarity between two subscriber profiles by computing the normalized mean-square-error (MSE) between their two rating vectors. Only items rated by both subscribers are used to compute the measure. Predictions are then made by considering all subscribers with a dissimilarity to the subscriber which is less than a threshold. The subscriber's predicted rating is computed as a weighted average of the ratings provided by these most similar subscribers, where the weights are inversely proportional to the dissimilarity.

An alternate approach is to use the standard Pearson $\rho$ correlation coefficient to measure profile similarity. This coefficient ranges from $-1$, indicating a negative correlation, to $+1$ indicating a positive correlation between two subscribers. Predictions are made by computing a weighted average of all of the Pebscribers' ratings, where the Pearson $\rho$ coefficients are used as the weights. In contrast with the MSE algorithm, this algorithm makes use of negative correlations as well as positive correlations to make predictions. A constrained Pearson algorithm uses only subscribers with positive coefficients to form the predictions.

Another approach, called the Artist-Artist algorithm, uses the correlation between artists, movies, or applications to predict how a subscriber will like a certain item based upon those items the subscriber has already rated. The correlation between items is based on a statistical analysis of all of the subscribers' ratings. The predicted rating is computed as a weighted average of the items that the subscriber has already rated, where the correlations between each item and the predicted item are used as the weights. Other techniques such as clustering, neural networks and fuzzy logic could be employed to perform the prediction.

The performance of these collaborative filtering systems improves as the number of subscribers increases relative to the number of available items. The chance of finding several subscribers who have similar tastes as any particular subscriber increases as the number of subscribers increases. Furthermore, the prediction accuracy will increase as the total number of selections rated by each subscriber increases. To improve start up performance, each subscriber should rate a common selection of items to place him or her among other subscribers with roughly similar tastes. As the subscriber requests and rates items, the subscriber's profile will more accurately reflect his or her preferences and will track changes in those preferences.

Figure 8:
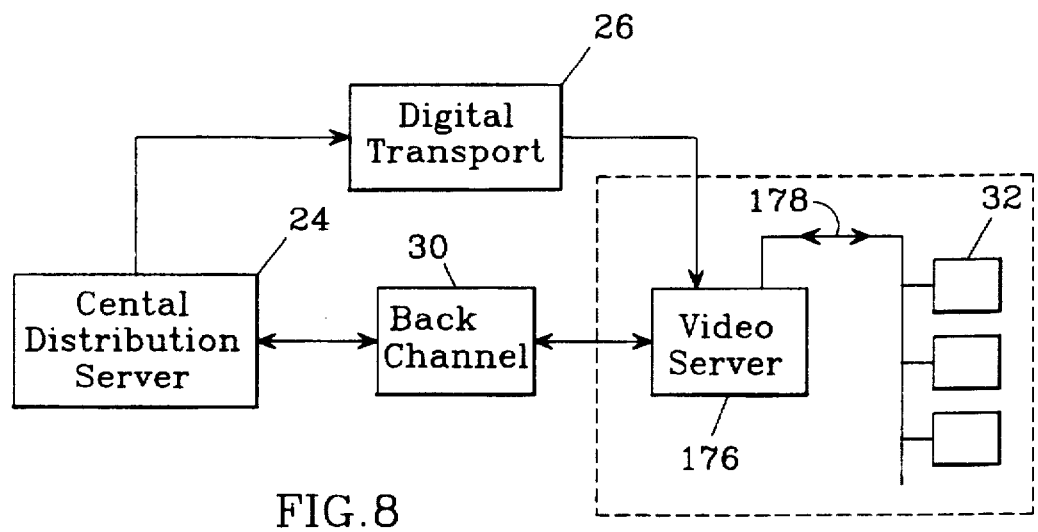
FIG. 8 is a diagram of an alternate virtual on-demand system architecture for serving local video servers.

FIG. 8 illustrates an alternate embodiment of the invention where each local server has been replaced by a video server 176 which serves a plurality of local subscribers. For example, a video server configuration may be used to service multiple televisions within a single home or to service all of the residents in an apartment complex. Each video server 176 includes the prediction filter 54, local storage 56, subscriber interface 58, and decryption/decompression processor 60 shown in FIG. 2. The video server communicates with the subscribers and their playback devices 32 over a dedicated local cable or wireless line 178. When one of the subscribers requests an item, the video server either retrieves it from the local storage or requests it from the central distribution server. Alternately, the subscriber may be limited to only those selections stored on the local video server. The video server then assigns the subscriber a dedicated channel and transmits the item to the requesting subscriber. The subscriber profiles sent to the central server and the list of recommended items sent to the video server 176 may either represent the individual interests of each subscriber or the collective interests of all the subscribers served by that particular video server. The video server provides virtual on-demand access to a wide range of items with interactive control without requiring each subscriber to maintain a local server. This may be a more cost effective approach in certain situations.

Figure 9:
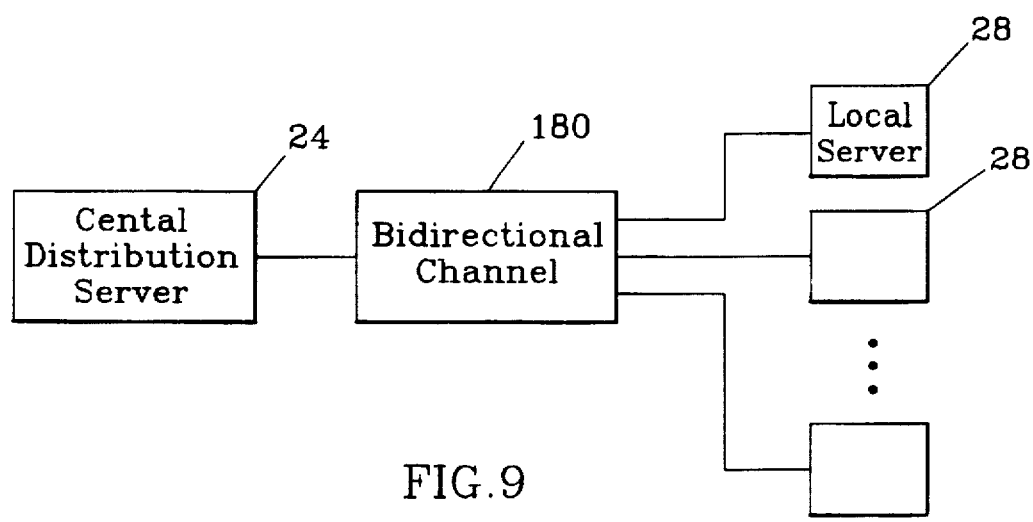
FIG. 9 is a diagram of an alternate virtual on-demand system architecture using a bi-direction fiber optical digital transport system.

As shown in FIG. 9, the delivery system 22 can be implemented with a single high bandwidth bidirectional digital transport system 180. The next generation cable and fiber optic point-to-point networks will provide this type of system.

While several illustrative embodiments of the invention have been shown and described, numerous variations and alternate embodiments will occur to those skilled in the art. For example, the collaborative filtering could be done at each local processor. Such variations and alternate embodiments are contemplated, and can be made without departing from the spirit and scope of the appended claims.

I claim:

1. A system for delivering virtual on-demand digital information to a plurality of local subscribers, comprising:

a central distribution server, comprising:

a repository for accessing a set of digital information items; and a scheduling system that responds to subscribers' on-demand request by scheduling the digital information items for broadcast;

a main channel having a known bandwidth for broadcasting the scheduled digital information items to said local subscribers;

a plurality of local servers, comprising a local storage for storing a plurality of the digital information items;

a subscriber interface for presenting the items to the subscriber and generating a subscriber profile, said interface responding to a subscriber request by first polling the local storage to locate the requested item and, if not found, polling the central distribution processor to form the on-demand request; and a local processor for retrieving the requested item from the local storage and delivering it to the local subscriber;

a collaborative filter system for synthesizing the subscriber profiles and generating a list of recommended items for each local subscriber based on said synthesis; and a back channel for communicating the lists of recommended items to the respective local subscribers and for communicating the subscriber profiles and on-demand requests to the central distribution server, said central distribution server responding to the recommended lists by scheduling the items on said lists for broadcast during off-peak hours so that said local servers download those items on their respective lists to their local storages, and said subscriber interfaces recommending the items on said lists to the respective subscribers to reduce the number of on-demand requests that are directed to the central distribution server thereby offloading a portion of the system's bandwidth requirement from the main channel to the local servers.

2. The system of claim 1, wherein said main and back channels comprise a bi-directional channel for communicating digital information between the central distribution server and the local subscribers.

3. The system of claim 2, wherein said bi-directional channel comprises a fiber optic network that connects the local subscribers to the central distribution server.

4. The system of claim 1, wherein said main channel comprises a high bandwidth digital transport system and said back channel comprises a low bandwidth digital transport system.

5. The system of claim 4, wherein said high bandwidth digital transport system, comprises:
- a central digital transmitter for transmitting the digital information items;
- a broadcast satellite for receiving the transmitted items and broadcasting them to the local subscribers;
- a plurality of local digital receivers for down-loading the digital information items.

6. The system of claim 5, wherein said low bandwidth digital transport system comprises a wire network that connects the local subscribers to the central distribution server.

7. The system of claim 1, wherein the subscriber profile comprises at least one of the subscriber's previous requests, the subscriber's ratings of previous requests, and the subscriber's personal demographics.

8. The system of claim 1, wherein said digital information items include videos and said local server comprises a video display, said subscriber interface displaying the list of recommended videos on the video display to prompt the subscriber request and displaying information on said video display for interactively generating the subscriber profile.

9. The system of claim 8, wherein said video display comprises a television set for playing said videos and broadcast television programs, said local server comprising a prediction filter that monitors the broadcast television viewing habits of the subscriber to identify programs that are viewed regularly, detects when one of those programs is not being viewed, and stores the program on the local storage.

10. The system of claim 8, wherein said digital information items include at least one of audio, software and data selections and said local server further comprises a CD ROM writer that writes the audio, software and data selections onto a CD ROM.

11. The system of claim 1, wherein said digital information items include videos and said local server comprises a video server for distributing videos to a group of said local subscribers.

12. The system of claim 1, wherein the scheduling system merges the on-demand requests and schedules them for broadcast in order from the most to the least requested.

13. The system of claim 1, wherein said central distribution server varies the number of items available to the subscribers based upon a current broadcasting load on the main channel.

14. The system of claim 1, wherein said collaborative filter system comprises:

- a central filter at said central distribution server that synthesizes the subscriber profiles and generates said lists;
- a plurality of prediction filters at the respective local servers for deleting those items from the local storage that are omitted from the list of recommended selections and for downloading, during off-peak hours, those items from the main channel that are on the list and not stored in the local storage and downloading those items that are broadcast in response to said on-demand requests.

15. A system for delivering virtual on-demand digital information to a plurality of local subscribers, comprising:
- a central distribution server, comprising:
  - a repository for accessing a set of digital information items;
  - a subscriber data base for receiving and storing a subscriber profile for each of the local subscribers;
  - a collaborative filter system for synthesizing the subscriber profiles, predicting those items that may interest each local subscriber, and generating a list of recommended items for each local subscriber based on said predictions; and
  - a scheduling system for scheduling the digital information items on said lists for broadcast during off-peak hours and for scheduling the digital items in response to requests from the local subscribers for on-demand broadcast;
- a high bandwidth digital transport system for broadcasting the scheduled digital information items to said local subscribers;
- a plurality of local servers, comprising
  - a local storage for storing a subset of the digital information items;
  - a predictive filter for deleting those items from the local storage that are omitted from the current list of recommended selections and for downloading, during off-peak hours, those items from the transport system that are on the list and not stored in the local storage and downloading those items that are broadcast in response to a subscriber request;
  - a subscriber interface for generating the subscriber profile and requesting one of the items from said set, said interface responding to a subscriber request by first polling the local storage to locate the requested item and, if not found, polling the central distribution processor to request the item, said subscriber interface recommending the items on said list to the subscriber to reduce the number of requests that are directed to the central distribution processor thereby offloading a portion of the system's bandwidth requirement from the digital transport system to the local servers; and
  - a local processor for retrieving the requested item from the local storage and passing it to a local playback device; and
- a low bandwidth back channel for communicating the lists of recommended items to the respective local subscribers and for communicating the subscriber profiles and requests to the central distribution server.

16. The system of claim 15, wherein said high bandwidth digital transport system, comprises:
- a central digital transmitter for transmitting the digital information items;
- a broadcast satellite for receiving the transmitted items and broadcasting them to the local subscribers;

a plurality of local digital receivers for down-loading the digital information items.

17. The system of claim 16, wherein said low bandwidth digital transport system comprises a wire network that connects the local subscribers to the central distribution server.

18. The system of claim 16, wherein the subscriber profile comprises at least one of the subscriber's previous requests, the subscriber's ratings of previous requests, and the subscriber's personal demographics.

19. The system of claim 18, wherein said digital information items include videos and said local server comprises a video display, said subscriber interface displaying the list of recommended videos on the video display to prompt the subscriber request and displaying information on said video display to interactively generate the subscriber profile.

20. The system of claim 16, wherein said digital information items include at least one of audio, software and data selections and said local server further comprises a CD ROM writer that writes the audio, software and data selections onto a CD ROM.

21. A system for delivering digital information to a plurality of local subscribers, comprising:
- a central distribution server, comprising:
  - a repository for accessing a set of digital information items;
  - a subscriber data base for receiving and storing a subscriber profile for each of the local subscribers;
  - a collaborative filter system for synthesizing the subscriber profiles, predicting those items that may interest each local subscriber, and generating a list of recommended items for each local subscriber based on said predictions; and
  - a scheduling system for scheduling the digital information items on said lists for broadcast during off-peak hours;
- a high bandwidth digital transport system for broadcasting the scheduled digital information items to said local subscribers;
- a plurality of local distribution systems, comprising
  - a local storage for storing a subset of the digital information items;
  - a predictive filter for deleting those items from the local storage that are omitted from the current list of recommended selections and for downloading, during off-peak hours, those items from the transport system that are on the list and not stored in the local storage;
  - a subscriber interface for generating the subscriber profile, presenting the items on said list to the subscriber, and requesting one of the items; and
  - a local processor for retrieving the requested item from the local storage and passing it to a local playback device; and
- a low bandwidth back channel for communicating the lists of recommended items to the respective local subscribers and for communicating the subscriber profiles to the central distribution server.

22. The system of claim 21, wherein said main and back channels comprise a bi-directional channel for communicating digital information between the central distribution server and the local subscribers.

23. A system for delivering virtual on-demand digital information to a plurality of local video servers, which in turn service respective groups of local subscribers, comprising:
- a central distribution server, comprising:
  - a repository for accessing a set of digital videos;
  - a subscriber data base for receiving and storing a subscriber profile for each of the local subscribers;
  - a collaborative filter system for synthesizing the respective groups of subscriber profiles, predicting those digital videos that may interest the respective groups, and generating a list of recommended videos for each group based on said predictions; and
  - a scheduling system for scheduling the digital videos on said lists for a periodic refresh broadcast;
- a high bandwidth digital transport system for broadcasting the scheduled digital videos;
- a plurality of local video servers for receiving the broadcast digital videos and servicing the respective groups of local subscribers, each local video server comprising:
  - a local storage for storing the digital videos on its group's list;
  - a predictive filter for deleting those videos from the local storage that are omitted from the current list of recommended videos and for downloading those videos from the transport system that are on the list and not stored in the local storage; and
  - a local processor for retrieving videos from the local storage in response to requests from local subscribers in the group and passing them on to the respective local subscribers, and for generating the subscriber profiles;
- a plurality of video displays for servicing the local subscribers in the respective groups, each video display comprising a subscriber interface for requesting one of the videos from the group's list of recommended videos stored in the corresponding local video server;
- a dedicated communications channel for each of said local video servers, said communications channel having a plurality of channels for distributing the videos to the video displays in the group; and
- a low bandwidth back channel for communicating the lists of recommended items to the respective local video servers and for communicating the subscriber profiles and requests to the central distribution server.

24. The system of claim 23, wherein the scheduling system schedules the videos on said lists for broadcast during off-peak hours and schedules videos in response to requests from the local subscribers for on-demand broadcast, said subscriber interface's responding to subscriber requests by first polling their respective local storages to locate the requested video and, if not found, polling the central distribution processor to request the video, said subscriber interface recommending the videos on said list to the subscriber to reduce the number of requests that are directed to the central distribution processor thereby off-loading a portion of the system's bandwidth requirement from the digital transport system to the local video servers.

25. The system of claim 23, wherein said subscriber interface's responds to subscriber requests by first polling their respective local storages to locate the requested video and, if not found, polling the central distribution processor to request the video, the scheduling system scheduling the requested videos for broadcast during a subsequent periodic refresh broadcast.

26. A method of delivering virtual on-demand digital information to a plurality of local subscribers through their respective playback devices during on and off-peak hours, comprising:
- storing a set of digital information items in a central distribution server;

storing a subscriber profile for each of the local subscribers in a subscriber data base;

generating a list of recommended items for each local subscriber based upon a synthesis of the subscriber profiles;

during off-peak hours, broadcasting the items on said lists over a digital transport system to said local subscribers;

broadcasting said lists over a back channel to the respective local subscribers;

downloading the items on said lists to a plurality of local servers, respectively; and returning updated subscriber profiles over the back channel to the subscriber data base; and during on and off-peak hours, in response to a subscriber request, polling said local storage device to retrieve the requested item, and if not found;

polling said central distribution server over said back channel to broadcast the requested item to the local subscriber where it is downloaded to the local storage and then retrieved;

playing the retrieved item on the requesting subscriber's playback device;

updating the requesting subscriber's profile; and recommending the items on said lists to the subscribers, respectively, to reduce the number of requests that are polled to the centralized storage device thereby offloading a portion of the bandwidth requirement on the digital transport system to the local storage devices.

27. The method of claim 26, wherein generating the lists of recommended items comprises:

grouping each local subscriber together with a plurality of the other local subscribers based upon a similarity metric between their subscriber profiles;

for each local subscriber, computing a rating for each item in said set based upon the subscriber profiles in that subscriber's grouping;

predicting which items each local subscriber will select based upon said ratings; and generating said lists of the recommended items based upon said predictions.

28. The method of claim 26, wherein broadcasting the items comprises:

merging said lists to prioritize the items from the most to the least recommended; and scheduling the items for broadcast in order from the most to the least recommended.

29. The method of claim 28, wherein broadcasting the items further comprises:

transmitting the items from the central distribution server to a broadcast satellite;

broadcasting the items from the satellite to a plurality of local receivers which are in communication with the respective local servers.

30. The method of claim 26, wherein said items include videos and the local playback devices comprise video displays, further comprising:

displaying the list of recommended items on the respective video displays to prompt the subscriber request.

31. The method of claim 30, wherein the subscriber profile includes a rating vector, comprising:

displaying a rating system on the video display that prompts the subscriber to rate the requested item after playback thereby updating the rating vector.

32. The method of claim 26, further comprising:

dynamically varying the number of items that are available to the local subscribers based on the current load of the central distribution server.

33. A system for delivering virtual on-demand digital information to a plurality of local subscribers, comprising:

a central distribution server, comprising:

a repository for accessing a set of digital information items;

a subscriber data base for receiving and storing a subscriber profile for each of the local subscribers;

a collaborative filter system for synthesizing the subscriber profiles, predicting those items that may interest each local subscriber, and generating a list of recommended items for each local subscriber based on said predictions; and a scheduling system for scheduling the digital information items on said lists for periodic refresh broadcasts;

a high bandwidth digital transport system for broadcasting the scheduled digital information items to said local subscribers;

a plurality of local distribution systems, comprising a local storage for storing the digital information items on its corresponding list;

a predictive filter for deleting those items from the local storage that are omitted from the current list of recommended selections and for downloading those items from the transport system that are on the list and not stored in the local storage;

a subscriber interface for generating the subscriber profile and requesting an item; and a local processor for retrieving the requested item from the local storage and passing it to a local playback device; and a low bandwidth back channel for communicating the lists of recommended items to the respective local subscribers and for communicating the subscriber profiles and requests to the central distribution server.

34. The system of claim 33, wherein the scheduling system schedules the items on said lists for broadcast during off-peak hours and schedules items in response to requests from the local subscribers for on-demand broadcast, said subscriber interface's responding to subscriber requests by first polling their respective local storages to locate the requested item and, if not found, polling the central distribution processor to request the item, said subscriber interface recommending the items on said list to the subscriber to reduce the number of requests that are directed to the central distribution processor thereby offloading a portion of the system's bandwidth requirement from the digital transport system to the local distribution systems.

35. The system of claim 33, wherein said subscriber interface's responds to subscriber requests by first polling their respective local storages to locate the requested item and, if not found, polling the central distribution processor to request the item, the scheduling system scheduling the requested items for broadcast during a subsequent periodic refresh broadcast.

* * * * *